United States Patent
Chou et al.

(10) Patent No.: US 9,031,587 B2
(45) Date of Patent: May 12, 2015

(54) MOBILE APPARATUS DATA SHARING METHOD, SYSTEM FOR SHARING DATA THROUGH MOBILE APPARATUS AND COMPUTER READABLE STORAGE MEDIUM STORING THE METHOD

(75) Inventors: Shih-Chun Chou, Taipei (TW); Bo-Fu Liu, Tainan (TW); Yu-Ting Lin, Chiayi (TW); Jih-Yiing Lin, Chiayi County (TW)

(73) Assignee: Institute for Information Industry, Taipei (TW)

( * ) Notice: Subject to any disclaimer, the term of this patent is extended or adjusted under 35 U.S.C. 154(b) by 578 days.

(21) Appl. No.: 13/494,185

(22) Filed: Jun. 12, 2012

(65) Prior Publication Data

US 2013/0150097 A1 Jun. 13, 2013

(30) Foreign Application Priority Data

Dec. 8, 2011 (TW) .............................. 100145399 A (51) Int. Cl.
H04W 4/00 (2009.01)
H04W 4/08 (2009.01)
H04W 4/12 (2009.01)

(52) U.S. Cl.
CPC . *H04W 4/08* (2013.01); *H04W 4/12* (2013.01)

(58) Field of Classification Search
CPC ............ H04W 4/08; H04W 4/06; H04W 4/12
USPC ......................................... 455/466, 517–519
See application file for complete search history.

(56) References Cited

U.S. PATENT DOCUMENTS

| | | | |
|---|---|---|---|
| 2004/0054746 | A1 | 3/2004 | Shibata |
| 2008/0064430 | A1* | 3/2008 | Kraft et al. .................... 455/518 |
| 2009/0104895 | A1 | 4/2009 | Kasturi et al. |
| 2009/0177744 | A1 | 7/2009 | Marlow et al. |
| 2010/0082693 | A1 | 4/2010 | Hugg et al. |
| 2010/0330972 | A1 | 12/2010 | Angiolillo |
| 2011/0093111 | A1 | 4/2011 | Meaney et al. |
| 2013/0073400 | A1* | 3/2013 | Heath ......................... 705/14.73 |
| 2013/0137462 | A1* | 5/2013 | Van Os et al. ............... 455/456.3 |

FOREIGN PATENT DOCUMENTS

| | | |
|---|---|---|
| CN | 1492655 A | 4/2004 |
| CN | 102118508 A | 7/2011 |
| TW | 200937214 A | 9/2009 |

OTHER PUBLICATIONS

English translation of abstract of TW 200937214 A (published Sep. 1, 2009).
English translation of abstract of CN 102118508 A (published Jul. 6, 2011).
English translation of abstract of CN 1492655 A (published Apr. 28, 2004).
China Office Action dated Jan. 19, 2015.

* cited by examiner

*Primary Examiner* — Shahriar Behnamian
(74) *Attorney, Agent, or Firm* — McClure, Qualey & Rodack, LLP (57) ABSTRACT

A mobile apparatus data sharing method includes the following steps: receiving a request for activating a sharing functionality on sharing data; obtaining context information of the mobile apparatus and a contact list which includes information of several candidate contacts; classifying the information of the candidate contacts into several candidate groups according to the context information; displaying the candidate groups via the mobile apparatus; determining a target contact group from the candidate contact groups according to a contact group selecting signal generated by the mobile apparatus; and transmitting the sharing data to the target contact group according to the information of the candidate contacts in the target contact group.

16 Claims, 4 Drawing Sheets

MOBILE APPARATUS DATA SHARING METHOD, SYSTEM FOR SHARING DATA THROUGH MOBILE APPARATUS AND COMPUTER READABLE STORAGE MEDIUM STORING THE METHOD

RELATED APPLICATIONS

This application claims priority to Taiwan Application Serial Number 100145399, filed Dec. 8, 2011, which is herein incorporated by reference.

BACKGROUND

1. Technical Field

The present invention relates to a mobile apparatus data sharing method, a system for sharing data through a mobile apparatus and a computer readable storage medium for storing the method. More particularly, the present invention relates to a method for sharing data according to context information of a mobile apparatus, a system applying the method and a computer readable storage medium for storing the method.

2. Description of Related Art

As technology develops, different electrical apparatuses are designed in our daily life. For example, electrical apparatuses, such as personal computers, laptop computers, mobile phones, are a must for people's life and work.

There is a trend to digitalize different data or files for electrical apparatuses. Furthermore, many data transmission interfaces (for example, email, Multimedia Messaging Service (MMS) and Short Message Service (SMS)) are developed to share data in electrical apparatuses.

In general, if users want to transmit data to other electrical apparatuses, they must acquire information of their target electrical apparatuses, such as email account or mobile phone number, in advance for database establishment. In addition, if they want to transmit data to several users' apparatuses, they must select the contact information of each apparatus, which is not convenient. Furthermore, even if contacts can be classified into several groups in advance, a fixed classification can not fit all situations. For instance, if a user want to transmit his/her data to other users who join a same conference, the classification made according to the contacts' living areas/working departments can not bring convenience during selecting the target for transmitting data to.

SUMMARY

According to one embodiment of this invention, a mobile apparatus data sharing method is provided to classify information of candidate contacts into several groups according to context information of a mobile apparatus for users to select contacts for sharing data. The mobile apparatus data sharing method includes the following operations:

(a) a request for activating a sharing functionality on sharing data is received via a mobile apparatus;

(b) context information of the mobile apparatus and a contact list are obtained, wherein the contact list includes information of several candidate contacts;

(c) the information of the candidate contacts is classified into several candidate contact groups according to the context information;

(d) the candidate contact groups are displayed via the mobile apparatus;

(e) determining, via the mobile apparatus, a target contact group from the candidate contact groups according to a contact group selecting signal which is generated by the mobile apparatus;

(f) the sharing data is transmitted to the target contact group, via the mobile apparatus, according to the information of the candidate contacts in the target contact group.

According to another embodiment of this invention, a computer readable storage medium is provided to store a computer program for executing the mobile apparatus data sharing method above. It is to be understood that a description of operations identical to those mentioned above will not be repeated.

According to another embodiment of this invention, a system for sharing data through a mobile apparatus is provided to classify information of candidate contacts into several groups according to context information of a mobile apparatus for users to select contacts for sharing data. The system includes a display unit, a data transmission unit, an activation unit, a storage unit and a processing unit. The processing unit is connected with the display unit, the data transmission unit, the activation unit and the storage unit. The activation unit generates a request for activating a sharing functionality on sharing data. The storage unit stores a contact list and information of the data-sharing activities of the user of the mobile apparatus. The contact list includes information of several candidate contacts. The processing unit includes an obtaining module, a classifying module, a selecting-signal generating module and a data transmission module. The obtaining module obtains context information of the mobile apparatus and the information of the candidate contacts in the contact list when the request for activating the sharing functionality is generated. The classifying module classifies the information of the candidate contacts into several candidate contact groups according to the context information of the mobile apparatus. The selecting-signal generating module generates a contact group selecting signal for selecting a target contact group from the candidate contact groups through the mobile apparatus, such that the target contact group is determined from the candidate contact groups according to the contact group selecting signal. The data transmission module activates the data transmission unit to transmit the sharing data to the target contact group according to the information of the candidate contacts in the target contact group.

In one embodiment of this invention, the system is installed on a mobile apparatus. In another embodiment of this invention, the elements of the system are discretely installed on a mobile apparatus and a server. The mobile apparatus is communicated with the server through a communication network. The mobile apparatus includes the display unit, the data transmission unit, the activation unit, the selecting-signal generating module and the data transmission module, and the server includes the storage unit, the obtaining module and the classifying module.

The present invention exhibits the following advantage: it can classify the contacts at real time, according to the context of the mobile apparatus, for the user to select the target for data transmission. In other words, the user does not need to classify his/her contacts in the contact list in advance. Furthermore, when this invention is applied to a mobile apparatus, it can classify the contacts according to the context and display only relevant groups of contacts. In this manner, this invention is especially suitable for mobile apparatuses with small display areas.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
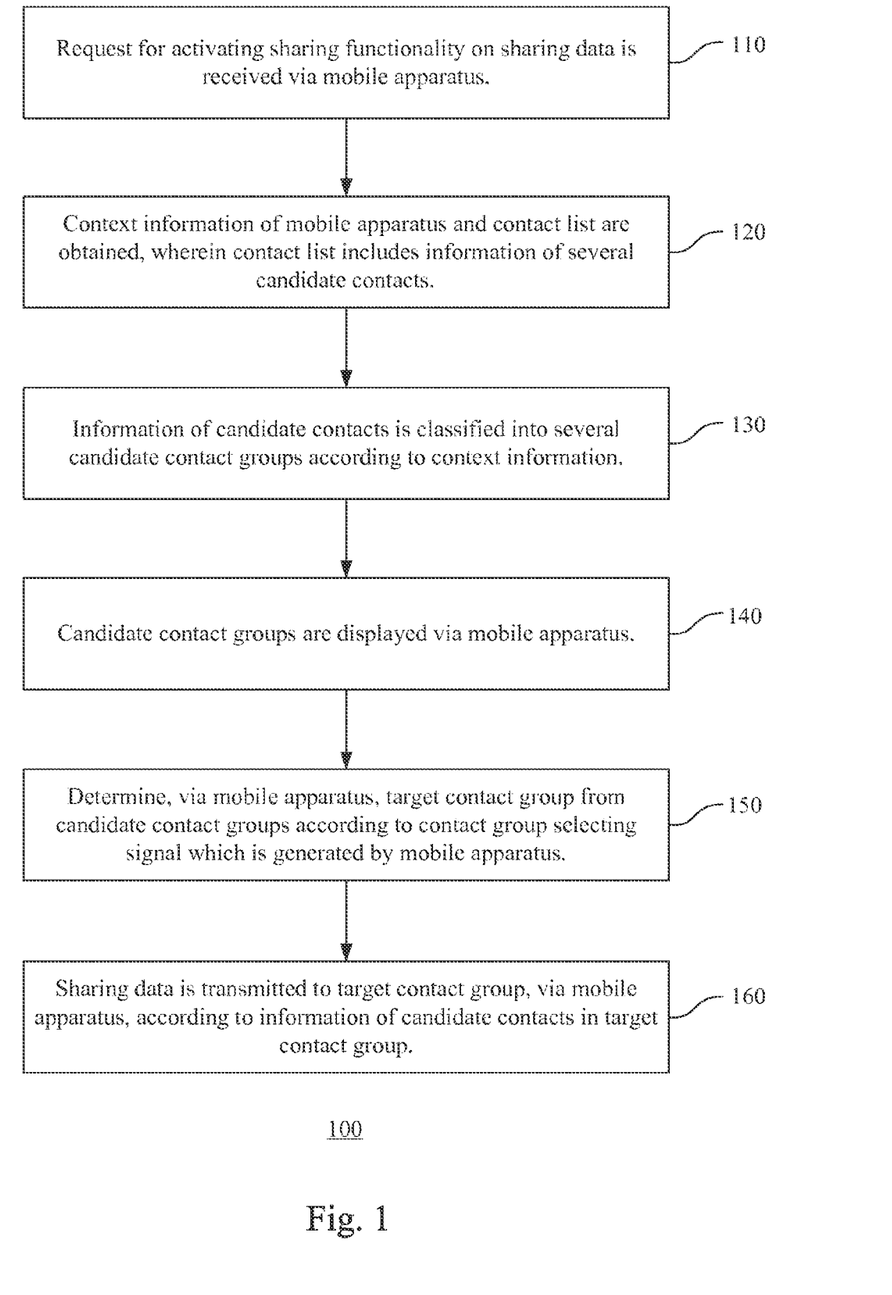
FIG. 1 is a flow diagram of a mobile apparatus data sharing method according to one embodiment of this invention.

Referring to FIG. 1, a flow diagram will be described that illustrates a mobile apparatus data sharing method according to one embodiment of this invention. In the mobile apparatus data sharing method, information of candidate contacts is classified into several groups according to context information of a mobile apparatus for users to select contacts for sharing data. The mobile apparatus data sharing method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The routine 100 of the mobile apparatus data sharing method starts at operation 110, where a request for activating a sharing functionality on sharing data is received via a mobile apparatus.

The routine 100 continues from operation 110 to operation 120, where context information of the mobile apparatus and a contact list are obtained. The contact list includes information of several candidate contacts. In one embodiment of this invention, the contact list may be pre-stored in a storage unit of the mobile apparatus. In another embodiment of this invention, the contact list may be obtained from a remote server (such as a social network server, a mail server or any other remote server) according to user account information stored in the mobile apparatus. The contact list may store identification information of a contact, contact information and any other personal information. The contact information may include email addresses, mobile phone numbers, instant message accounts, social network accounts, etc. Any other personal information may include served companies, departments, professional titles, professional specialties, category, to-do lists, etc. In some embodiments at operation 120, the context information of the mobile apparatus may be generated by analyzing a file name of the sharing data, content of the sharing data, keywords of the sharing data or any other related information of the sharing data. In some embodiments, the context information of the mobile apparatus may be generated according to a present status of its user, a to-do list of its user, an activity joined by its user, the time for activating the data sharing, a present location of the mobile apparatus or any other related information.

The routine 100 continues to operation 130, where the information of the candidate contacts is classified into several candidate contact groups according to the context information. As a result, the information of the candidate contacts may be classified in different ways according to different context information. In one scenario, when a user wants to share data about a specified topic, the information of the candidate contacts may be classified according to the relation between the user and the candidate contacts. In another scenario, when a user has a task of joining a specific activity or conference in his/her to-do list and the data to be shared is related to such activity or conference, the information of the candidate contacts may be classified according to the to-do lists of the contacts in the contact list who may be joining the same activity or conference. In still another embodiment, the classification may be made according to data-sharing history of the user of the mobile apparatus.

In some embodiments, in operation 130, a suggested classification attribute sequence may be generated according to the context information. The suggested classification attribute sequence includes several classification attributes in a classification attribute order. In subsequence, the information of the candidate contacts may be classified into the candidate contact groups according to the classification attributes and the classification attribute order. For example, the classification attributes may include locations of the candidate contacts, distances between the candidate contacts and the mobile apparatus applying the routine 100, professions of the candidate contacts, any other attributes for classification or combination thereof. In addition, classifying according to the classification attributes and the classification attribute order may be implemented via a decision tree, a Bayesian network, a support vector machine (SVM), a kernel estimation or any other classification algorithm.

The routine 100 continues to operation 140, where the candidate contact groups are displayed via the mobile apparatus. For example, the mobile apparatus may display the candidate contact groups through its display unit, such as a screen and a user interface, for a user to select from the displayed candidate contact groups.

The routine 100 continues to operation 150, where a target contact group is determined via the mobile apparatus from the candidate contact groups according to a contact group selecting signal which is generated by the mobile apparatus. In some embodiments, a user may select from the candidate contact groups displayed on the display unit, such as a screen or any other display unit, through a user interface, such that the mobile apparatus may generate a corresponding selecting signal. In one embodiment of this invention, a user may select through an input unit of the mobile apparatus to generate a corresponding selecting signal. The input unit may be a mouse, a keyboard, at least one button, a touch screen or any other input unit.

In some embodiments, a touch screen may be utilized for being the display unit and the input unit of the mobile apparatus mentioned above. In subsequence, the touch screen of the mobile apparatus may display the classified candidate contact groups. Hence, a user can touch the corresponding display area of the touch screen to do selection, such that the touch screen may generate the corresponding selecting signal according to the touched position on the same.

The routine 100 continues to operation 160, where the sharing data is transmitted to the target contact group, via the mobile apparatus, according to the information of the candidate contacts in the target contact group. Such transmission may be performed by utilizing an email service, a Multimedia Messaging Service (MMS), a Short Message Service (SMS), an instant message (IM) program, a social network, or any other method for transmitting data. Therefore, contacts in the contact lists may be classified at real-time, which can provide a classification suitable for the context of the user of the mobile apparatus. In subsequence, a user can select his/her target through the classified contact groups to share data, which provide convenience. In other words, a user does not have to classify his/her contacts in the contact list in advance, and the contacts in the contact list may be classified in a suitable way for users to make their selection, which provide convenience, especially for mobile apparatuses with small screens. In some embodiments, if the routine 100 of the mobile apparatus data sharing method is applied to a mobile apparatus, contacts in the contact list of the mobile apparatus may be classified in a suitable way according to the present situation, which may provide groups fitting users' need with precision. As a result, the problem of the small screen of mobile apparatus which are incapable of displaying many group or a lot of information and the repetitive operations for selecting the target contacts to share data, which could avoid inconvenience.

Figure 2A:
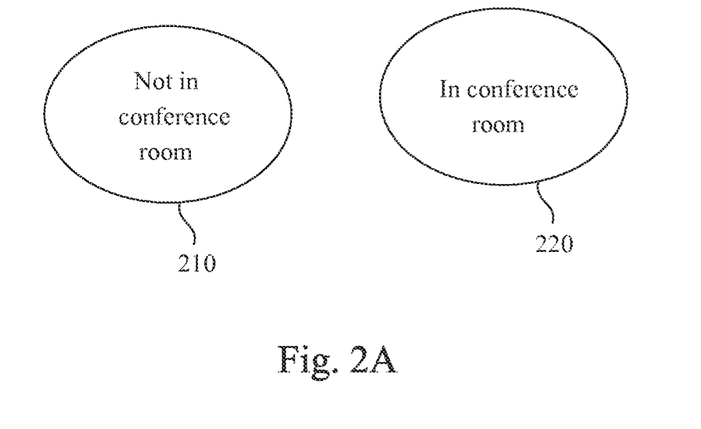
FIG. 2A illustrates a scenario which applies the routine 100 of the mobile apparatus data sharing method for classification.

In another embodiment of operation 130, at least one of several attributes may be selected for classification according to a classification attribute sequence. In one embodiment, the first attribute or the first few attributes of the classification attribute sequence may be selected and utilized for classification. In another embodiment, a user interface may be provided to a user to perform his/her selection operation. Hence, at least one attribute may be selected from the classification attributes as at least one first layer attribute according to the classification attribute order. In subsequence, the information of the candidate contacts may be classified into several first layer contact groups, which are taken as candidate contact groups, according to the at least one first layer attribute. FIG. 2A illustrates a scenario which applies the routine 100 of the mobile apparatus data sharing method for classification. In this embodiment, "location of contacts" is selected as the first layer attribute according to the classification attribute order. In subsequence, the information of the candidate contacts may be classified into the "not in the conference room" contact group 210 and the "in the conference room" contact group 220.

Figure 2B:
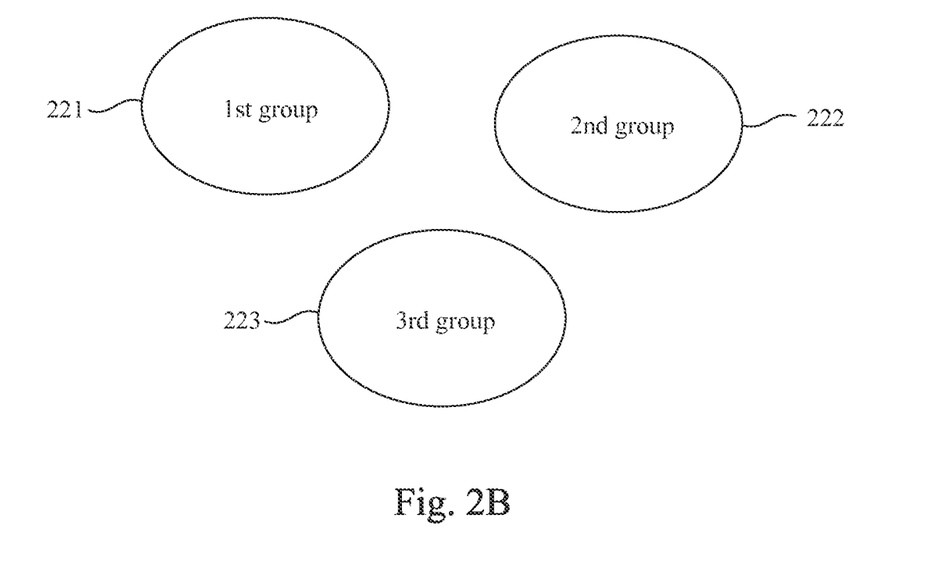
FIG. 2B illustrates a scenario which applies the routine 100 of the mobile apparatus data sharing method for further classification.

In another embodiment of this invention, a user may select one of the first layer contact groups for further classification through the mobile apparatus. Hence, one of the first layer contact groups is selected via the mobile apparatus in one embodiment of operation 140. In addition, at least one of the classification attributes is selected as at least one second layer attribute according to the classification attribute order corresponding to the selected first layer contact group. In subsequence, the information of the candidate contacts in the selected first layer contact group is classified into several second layer contact groups, which are taken as the candidate contact groups, according to the at least one second layer attribute. FIG. 2B illustrates a scenario which applies the routine 100 of the mobile apparatus data sharing method for further classification. In this embodiment, the user selects the "in the conference room" contact group 220 through his/her mobile apparatus (for example, an input unit of his/her mobile apparatus). In subsequence, at least one of the classification attributes (for example, discussion group number in the conference room) is selected as at least one second layer attribute according to the classification attribute order corresponding to the selected first layer contact group. Subsequently, the information of the candidate contacts in the selected "in the conference room" contact group 220 is classified into several second layer contact groups "$1^{st}$ group 221", "$2^{nd}$ group 222" and "$3^{rd}$ group 223", which are taken as the candidate contact groups according to the discussion group number in the conference room. Therefore, if the first layer classification is not good enough for a user of the mobile apparatus, the selected group can be further classified to fit the present situation. In still another embodiment of this invention, if the classification attribute does not fit the user's need perfectly (for example, the targets that the user want to share data for are not classified in the same group), the user can select parts of the contacts in one group and further select parts or all of the contacts in another group. In subsequence, such selection may be recorded for consideration in the classification next time.

Figure 3:
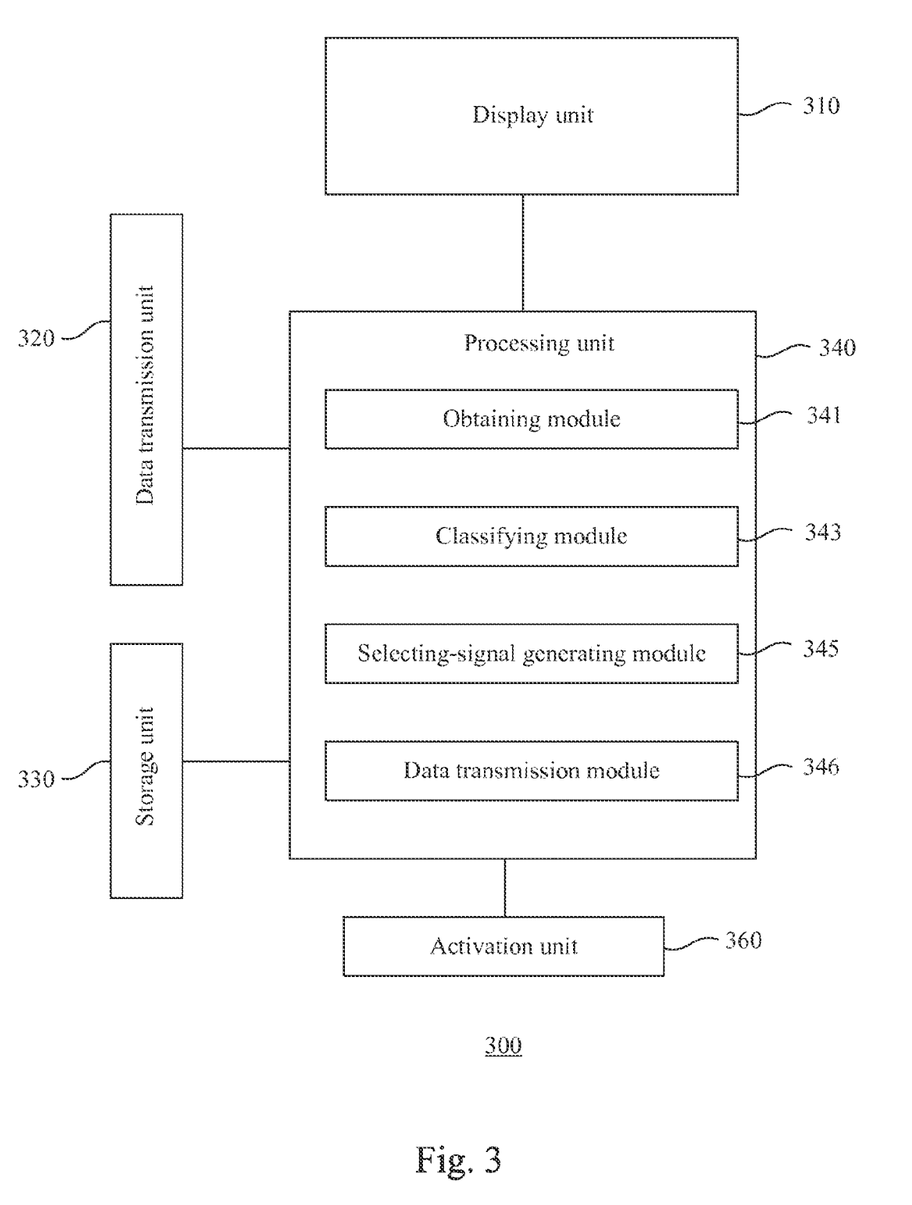
FIG. 3 illustrates a block diagram of a system for sharing data through a mobile apparatus according to an embodiment of this invention.

FIG. 3 illustrates a block diagram of a system for sharing data through a mobile apparatus according to an embodiment of this invention. The system classifies information of candidate contacts into several groups according to context information of a mobile apparatus for users to select contacts for sharing data. In one embodiment of this invention, the system can be installed on one single mobile apparatus. In other words, the mobile apparatus itself can function as the system for sharing data. In another embodiment of this invention, the elements of the system are discretely installed on a mobile apparatus and a server. The mobile apparatus may build a communication connection with the server through a wired or wireless communication network to form such system.

The system 300 includes a display unit 310, a data transmission unit 320, a storage unit 330, a processing unit 340 and an activation unit 360. The processing unit 340 communicates with the display unit 310, the data transmission unit 320, the storage unit 330 and the activation unit 360. The display unit 310, the data transmission unit 320 and the activation unit 360 are disposed on the mobile apparatus. In one embodiment, the storage unit 330 can be disposed on the mobile apparatus. In another embodiment of this invention, the storage unit 330 can be disposed on a server, and the mobile apparatus can build a communication connection with the server for data transmission. In still another embodiment of this invention, the storage unit 330 can be disposed discretely on both the mobile apparatus and the server. The storage unit 330 stores a contact list. The contact list includes information of several candidate contacts.

The processing unit 340 mainly includes an obtaining module 341, a classifying module 343, a selecting-signal generating module 345 and a data transmission module 346. In one embodiment, the modules of the processing unit 340 are implemented on at least one processing unit of a single mobile apparatus. In another embodiment of this invention, the modules of the processing unit 340 are discretely implemented on processing units of a mobile apparatus and a server. For example, the mobile apparatus and the server both include processing units, the processing unit of the mobile apparatus may include the selecting-signal generating module 345 and the data transmission module 346, and the processing unit of the server may include the obtaining module 341 and the classifying module 343. In other embodiments, the modules of the processing unit 340 may be disposed in the processing units of the mobile apparatus and the server in different ways, which should not be limited in this disclosure.

The activation unit 360 generates a request for activating a sharing functionality on sharing data. When such request is received, the obtaining module 341 obtains context information of the mobile apparatus and the information of the candidate contacts in the contact list. In one embodiment of this invention, the processing unit 340 determines the scenario of the mobile apparatus by analyzing its context information: a file name of the sharing data, content of the sharing data, keywords of the sharing data or any other related information of the sharing data. In another embodiment of this invention, the context information of the mobile apparatus may include a present status of its user, a to-do list of its user, an activity joined by its user, the time for activating the data sharing, a present location of the mobile apparatus or any other related information.

The classifying module 343 classifies the information of the candidate contacts into several candidate contact groups according to the context information. In some embodiments, the classifying module 343 may utilize a decision tree, a Bayesian network, an SVM, a kernel estimation or any other classification algorithm to do classification. Furthermore, when such algorithms require the contact-selection history of the user, the storage unit 330 may store the selection history of the user to provide to the classification algorithm for learning and enhancing the classification precision.

Subsequently, after a user selects a target contact group through the mobile apparatus, the selecting-signal generating module 345 generates a corresponding contact group selecting signal for selecting the target contact group from the candidate contact groups through the mobile apparatus. Hence, the target contact group is determined from the candidate contact groups according to the contact group selecting signal. The data transmission module 346 activates the data transmission unit 320 to transmit the sharing data to the target contact group according to the information of the candidate contacts in the target contact group. Therefore, contacts in the contact lists may be classified at real-time, which can provide a classification suitable for the context of the mobile apparatus. In subsequence, a user can select his/her target through the classified contact groups to share data, which provide convenience. In other words, a user does not have to classify his/her contacts in the contact list in advance, and the contacts in the contact list may be classified in a suitable way and be displayed on the display unit 310 of the mobile apparatus for users to make their selection, which provide convenience, especially for mobile apparatuses with small screens. As a result, the problem of the small screen of mobile apparatus which are incapable of displaying many group or a lot of information and the repetitive operations for selecting the target contacts to share data, which could avoid inconvenience.

Figure 4:
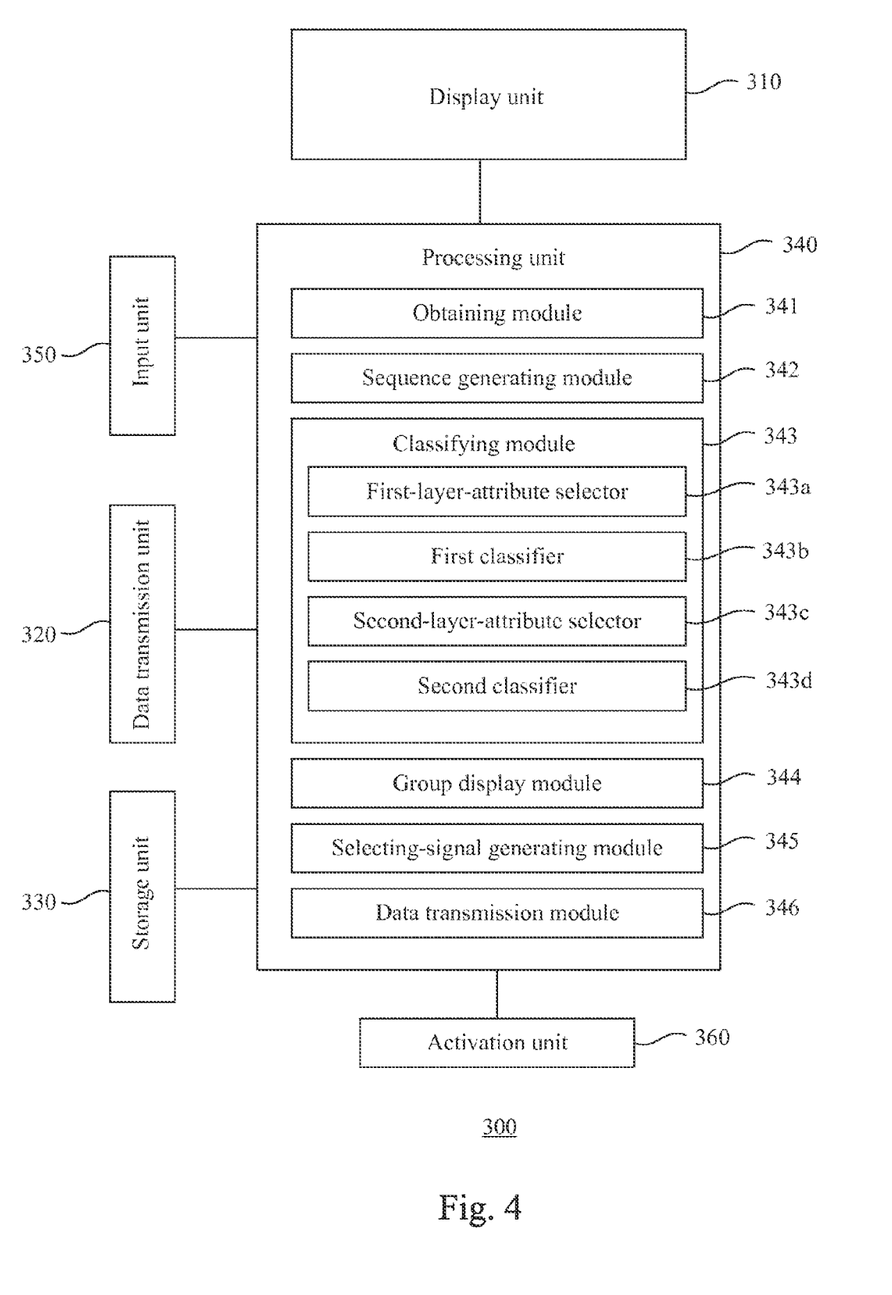
FIG. 4 illustrates a block diagram of a system for sharing data through a mobile apparatus according to another embodiment of this invention.

Referring to FIG. 4, a block diagram will be described that illustrates a system for sharing data through a mobile apparatus according to another embodiment of this invention. It is to be understood that a description of elements identical to those mentioned above will not be repeated In one embodiment, the processing unit may further include a sequence generating module 342 for generating a suggested classification attribute sequence according to the context information. The suggested classification attribute sequence includes several classification attributes in a classification attribute order. For example, the classification attributes may include locations of the candidate contacts, distances between the candidate contacts and the mobile apparatus, professions of the candidate contacts, any other attributes for classification or combination thereof. In another embodiment, the processing unit 340 may further include a group display module 344 to drive the display unit 310 to display the candidate contact groups. In subsequence, a user may select from the candidate contact groups displayed on the display unit 310.

The system 300 may further include an input unit 350. In one embodiment, the input unit 350, a button, a touch screen . . . etc., may be connected to the processing unit 340. In one embodiment, the input unit 350 may generate and transmit signals to the processing unit 340 through a communication network. A user may select through the input unit 350, and then the input unit 350 generates the corresponding contact group selecting signal. The input unit may be a mouse, a keyboard, at least one button, a touch screen or any other type of input unit. In some embodiments, a touch screen may be utilized for being the display unit 310 and the input unit 350. In subsequence, the touch screen of the mobile apparatus may display the classified candidate contact groups. Hence, a user can touch the corresponding display area of the touch screen to do selection, such that the touch screen may generate the corresponding selecting signal to the selecting-signal generating module 345.

In one embodiment of this invention, the classification module 343 may select at least one of several attributes for classification according to a classification attribute sequence. Hence, the classification module 343 may include a first-layer-attribute selector 343a and a first classifier 343b. The first-layer-attribute selector 343a selects at least one first layer attribute from the classification attributes according to the classification attribute order. The first classifier 343b classifies the information of the candidate contacts into several first layer contact groups, which are taken as the candidate contact groups for selection, according to the at least one first layer attribute.

Furthermore, a user can select one of the at least one of the candidate contact groups through the input unit 350 of the system 300 for further classification. The classifying module 340 may further include a second-layer-attribute selector 343c and a second classifier 343d. A user may select one of the first layer contact groups through the input unit 350. Subsequently, the second-layer-attribute selector 343c selects at least one of the classification attributes as at least one second layer attribute according to the classification attribute order corresponding to the selected first layer contact group. In subsequence, the second classifier 343d classifies the information of the candidate contacts in the selected first layer contact group into several second layer contact groups, which are taken as the candidate contact groups for selection, according to the at least one second layer attribute. Therefore, if the first layer classification is not good enough for a user of the system 300, the selected group can be further classified to fit the present situation.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A mobile apparatus data sharing method comprising:
   (a) receiving, via a mobile apparatus, a request for activating a sharing functionality on sharing data;
   (b) obtaining context information of the mobile apparatus and a contact list, wherein the contact list comprises information of a plurality of candidate contacts;
   (c) classifying the information of the candidate contacts into a plurality of candidate contact groups according to the context information;
   (d) displaying the candidate contact groups via the mobile apparatus;
   (e) determining, via the mobile apparatus, a target contact group from the candidate contact groups according to a contact group selecting signal which is generated by the mobile apparatus; and
   (f) transmitting the sharing data to the target contact group, via the mobile apparatus, according to the information of the candidate contacts in the target contact group.

2. The mobile apparatus data sharing method of claim 1, wherein operation (c) comprises:
   generating a suggested classification attribute sequence according to the context information, wherein the suggested classification attribute sequence comprises a plurality of classification attributes in a classification attribute order; and
   classifying the information of the candidate contacts into the candidate contact groups according to the classification attributes and the classification attribute order.

3. The mobile apparatus data sharing method of claim 2, wherein operation (c) further comprises:
   selecting at least one attribute from the classification attributes as at least one first layer attribute according to the classification attribute order; and
   classifying the information of the candidate contacts into a plurality of first layer contact groups, which are taken as candidate contact groups, according to the at least one first layer attribute.

4. The mobile apparatus data sharing method of claim 3, wherein operation (c) further comprises:
   selecting, via the mobile apparatus, one of the first layer contact groups;
   selecting at least one of the classification attributes as at least one second layer attribute according to the classification attribute order corresponding to the selected first layer contact group; and
   classifying the information of the candidate contacts in the selected first layer contact group into a plurality of second layer contact groups, which are taken as the candidate contact groups, according to the at least one second layer attribute.

5. The mobile apparatus data sharing method of claim 1, wherein operation (f) is performed by utilizing an email service, a Multimedia Messaging Service (MMS) or a Short Message Service (SMS) to transmit the sharing data to the target contact group.

6. The mobile apparatus data sharing method of claim 1, further comprising:
   generating the contact group selecting signal through an input unit of the mobile apparatus.

7. The mobile apparatus data sharing method of claim 1, wherein the mobile apparatus comprises a touch screen, the candidate contact groups is displayed by the touch screen, and when the touch screen is touched at a position, the contact group selecting signal is generated according to the touched position at operation (e).

8. A system for sharing data through a mobile apparatus comprising:
   a display unit;
   a data transmission unit;
   an activation unit for generating a request for activating a sharing functionality on sharing data;
   a storage unit for storing a contact list, wherein the contact list comprises information of a plurality of candidate contacts; and
   a processing unit connected with the display unit, the data transmission unit, the activation unit and the storage unit, wherein the processing unit comprises:
      an obtaining module for obtaining context information of the mobile apparatus and the information of the candidate contacts in the contact list when the request for activating the sharing functionality is generated;
      a classifying module for classifying the information of the candidate contacts into a plurality of candidate contact groups according to the context information;
      a selecting-signal generating module for generating a contact group selecting signal for selecting a target contact group from the candidate contact groups through the mobile apparatus, such that the target contact group is determined from the candidate contact groups according to the contact group selecting signal; and
      a data transmission module for activating the data transmission unit to transmit the sharing data to the target contact group according to the information of the candidate contacts in the target contact group.

9. The system for sharing data through a mobile apparatus of claim 8, wherein the system is installed on the mobile apparatus.

10. The system for sharing data through a mobile apparatus of claim 8, wherein the system is discretely installed on the mobile apparatus and a server, the mobile apparatus builds a communication connection with the server through a communication network; the mobile apparatus comprises the display unit, the data transmission unit, the activation unit, the selecting-signal generating module and the data transmission module, and the server comprises the storage unit and the processing unit.

11. The system for sharing data through a mobile apparatus of claim 8, wherein the processing unit further comprises:
   a sequence generating module for generating a suggested classification attribute sequence according to the context information, wherein the suggested classification attribute sequence comprises a plurality of classification attributes in a classification attribute order,
   wherein the classifying module classifies the information of the candidate contacts into the candidate contact groups for selection according to the classification attributes and the classification attribute order.

12. The system for sharing data through a mobile apparatus of claim 11, wherein the classifying module comprises:
   a first-layer-attribute selector for selecting at least one first layer attribute from the classification attributes according to the classification attribute order; and
   a first classifier for classifying the information of the candidate contacts into a plurality of first layer contact groups, which are taken as the candidate contact groups for selection, according to the at least one first layer attribute.

13. The system for sharing data through a mobile apparatus of claim 12, wherein the classifying module further comprises:
- an input unit for selecting one of the at least one of the candidate contact groups;
- a second-layer-attribute selector for selecting at least one of the classification attributes as at least one second layer attribute according to the classification attribute order corresponding to the selected first layer contact group; and
- a second classifier for classifying the information of the candidate contacts in the selected first layer contact group into a plurality of second layer contact groups, which are taken as the candidate contact groups for selection, according to the at least one second layer attribute.

14. The system for sharing data through a mobile apparatus of claim 8 further comprising:
- an input unit, electrically connected with the processing unit, wherein the contact group selecting signal is generated through the input unit and transmitted to the selecting-signal generating module.

15. The system for sharing data through a mobile apparatus of claim 8, wherein the display unit is a touch screen.

16. A non-transitory computer readable storage medium with a computer program to execute a mobile apparatus data sharing method wherein the mobile apparatus data sharing method comprises: (a) receiving, via a mobile apparatus, a request for activating a sharing functionality on sharing data; (b) obtaining context information of the mobile apparatus and a contact list, wherein the contact list comprises information of a plurality of candidate contacts; (c) classifying the information of the candidate contacts into a plurality of candidate contact groups for selection according to the context information; (d) displaying the candidate contact groups through the mobile apparatus; (e) determining, via the mobile apparatus, a target contact group from the candidate contact groups according to a contact group selecting signal which is generated by the mobile apparatus; and (f) transmitting the sharing data to the target contact group, via the mobile apparatus, according to the information of the candidate contacts classified in the target contact group.

* * * * *